(No Model.)
R. C. NUGENT.
PIPE COUPLING.
No. 322,845. Patented July 21, 1885.
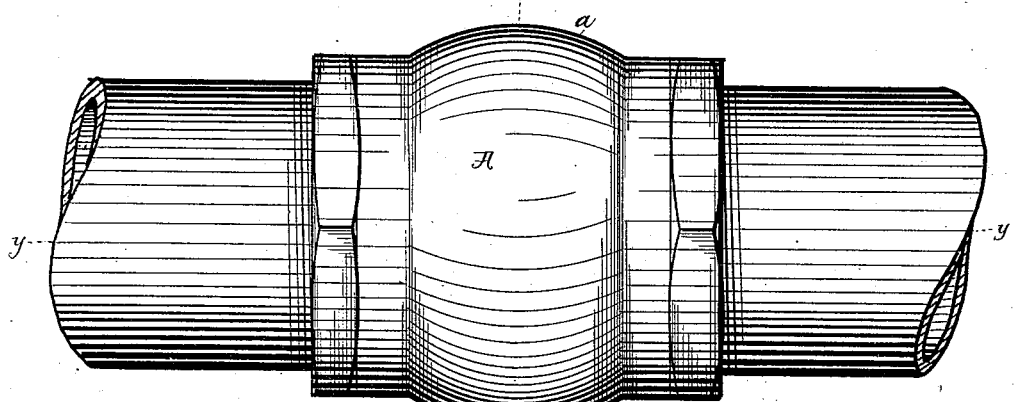
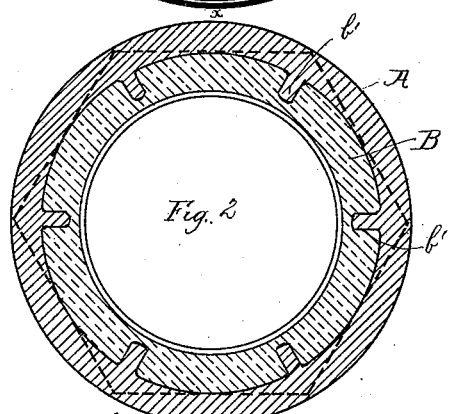
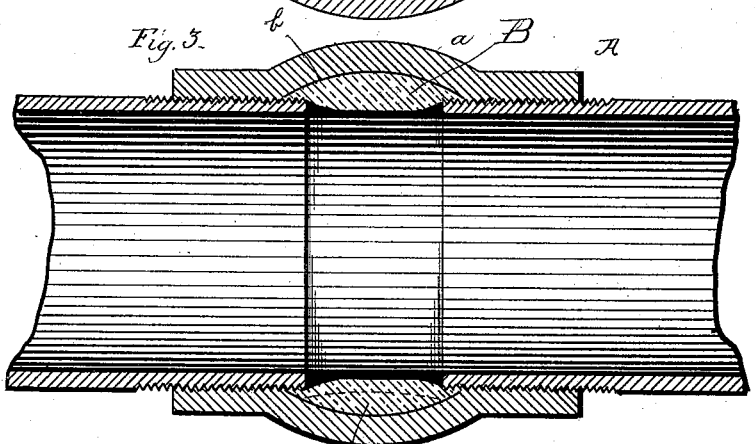
Witnesses:
W. D. Thomas
A. Ruppert
Inventor.
Richard C. Nugent
his
Lence Simpson & Co

UNITED STATES PATENT OFFICE.

RICHARD C. NUGENT, OF PITTSBURG, PENNSYLVANIA, ASSIGNOR OF ONE-HALF TO LENOX SIMPSON, OF SAME PLACE.

PIPE-COUPLING.

SPECIFICATION forming part of Letters Patent No. 322,845, dated July 21, 1885.

Application filed June 8, 1885. (No model.)

*To all whom it may concern:*

Be it known that I, RICHARD C. NUGENT, a citizen of the United States, residing at Pittsburg, in the county of Allegheny and State of Pennsylvania, have invented certain new and useful Improvements in Pipe-Couplings, of which the following is a full, clear, and exact description.

The object of the invention is to provide a coupling which shall be tight under heavy pressure of air, gas, or other fluid, and which shall be easily connected, inexpensive, and durable.

The invention consists in a coupling having an interior annular chamber provided with a soft-metal gasket, and means for preventing the revolution of said gasket.

In the drawings, Figure 1 is a plan view of the coupling; Figs. 2 and 3, sections of same on lines $xx$ and $yy$, respectively, of Fig. 1.

Similar letters of reference indicate corresponding parts throughout the figures.

A is the coupling constructed, preferably, of cast metal, and at its middle increased in diameter to form an annular swell, $a$. The interior of said coupling is thereby enlarged at said swell, and forms an annular gasket-chamber, $b$. The coupling is provided on the inside of the swelled portion with longitudinal fins $b'$, whose function is to prevent the displacement of the gasket when the extremities of the pipe are forced against the latter. The gasket B fills the annular chamber $b$, and extends at its middle somewhat above the internal surface of the coupling, sloping at each extremity toward the coupling-threads. Said gasket is cast within the coupling subsequent to the formation of the threads upon the latter, and its outer edges extend for some little distance along said thread. The gasket is formed by screwing two mandrels of suitable form into the opposite ends of the coupling until they meet. One of said mandrels is provided with a longitudinal groove, through which the molten lead or other material may be poured. When the lead or other material has set, the mandrels are withdrawn, and the coupling is ready for use.

The operation is as follows: As the ends of the pipe are screwed into the coupling they impinge upon the lead gasket, and the substance of the latter is forced between the threads of the pipes and those of the coupling, thus effectively sealing the joint. The farther the ends of the pipe are forced within the coupling, the more extended will the sealed area become. The fins $b'$ at all times prevent the revolution of the gasket and its consequent loosening.

The advantages of my coupling will be more readily perceived by a comparison with the methods heretofore in use. In the ordinary pipe-coupling the surface of the threaded portion of the pipe is tapered, while that of the coupling or socket is plain or cylindrical. When the pipes are screwed into the socket, they must be forced in until the edges of the socket are practically spread before a joint of proper tightness can be obtained. The joint is then tight only at the rear end of the pipe-threads and the front ends of the sockets. If, now, the threads of the pipes and of the sockets do not correspond exactly, or if the pipe is not started "true," the joint is never tight. Furthermore, with large couplings—as eight, ten, twelve or more inches—three or more men are required to make the joint. Now, with my coupling, the same accuracy of fitting is not required, it mattering little whether a perfect joint be formed at the rear of the pipe-thread or not. Even though the threads of the pipes and coupling cut into or "strip" each other to a limited extent, the tightness of the joint formed by the extremities of the pipes, the gasket, and the coupling remains unimpaired. Furthermore, with my construction, a cast-iron coupler may be used with pipes employed to transmit natural gas or steam under high pressure, since the lead of the gasket always separates the iron from the steam or gas. With the ordinary joint, cast iron will not hold natural gas or steam under heavy pressure.

I am aware that the use of lead gaskets for pipe-joints is not broadly new, a loose lead ring having been heretofore placed within the coupler between the juxtaposed ends of the pipes; but the use of this gasket has been practically abandoned for the reason that the gasket was ground to pieces between the rough edges of the pipe ends before an absolutely-tight joint could be made. With my coupling the gasket is not, to any practical extent, brought in contact with the pipe ends, the whole force exerted tending to drive the lead between the threads. One distinctive difference between the herein-described coupling and those in which gaskets have been heretofore used consists in this: With my coupling the gasket is interposed between the pipe and the coupler, while in other forms the gasket seals the abutting ends of the pipes together, and bears no particular relation to the coupler.

Having thus described my invention, what I claim is—

The coupler A, provided with chamber $b$, fins $b'$, and gasket B, substantially as and for the purposes set forth.

RICHARD C. NUGENT.

Witnesses:
HENRY C. LYON,
LENOX SIMPSON.